(12) United States Patent
Sugeno et al.

(10) Patent No.: US 10,587,127 B2
(45) Date of Patent: Mar. 10, 2020

(54) CHARGING DEVICE, CHARGING CONTROL METHOD, ELECTRICITY STORAGE DEVICE, POWER STORAGE DEVICE, POWER SYSTEM, AND ELECTRIC VEHICLE

(71) Applicant: Murata Manufacturing Co., Ltd., Kyoto (JP)

(72) Inventors: Naoyuki Sugeno, Fukushima (JP); Hisato Asai, Tochigi (JP); Eiji Kumagai, Ibaraki (JP); Noritoshi Imamura, Fukushima (JP); Koji Umetsu, Fukushima (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 371 days.

(21) Appl. No.: 15/107,007

(22) PCT Filed: Mar. 18, 2015

(86) PCT No.: PCT/JP2015/001495
§ 371 (c)(1),
(2) Date: Jun. 21, 2016

(87) PCT Pub. No.: WO2015/151432
PCT Pub. Date: Oct. 8, 2015

(65) Prior Publication Data
US 2018/0198289 A1    Jul. 12, 2018

(30) Foreign Application Priority Data
Apr. 4, 2014    (JP) .................................. 2014-078088

(51) Int. Cl.
H02J 7/00    (2006.01)
H02J 7/04    (2006.01)
(Continued)

(52) U.S. Cl.
CPC .......... H02J 7/0014 (2013.01); B60L 3/0046 (2013.01); B60L 3/12 (2013.01); B60L 50/16 (2019.02);
(Continued)

(58) Field of Classification Search
None
See application file for complete search history.

(56) References Cited

U.S. PATENT DOCUMENTS

2010/0011048 A1    7/2010    Hajime
2011/0027651 A1    2/2011    Sun
(Continued)

FOREIGN PATENT DOCUMENTS

CN    101689677    3/2010
JP    2005-151683 A    6/2005
(Continued)

OTHER PUBLICATIONS

International Search Report issued in PCT/JP2015/001495, 3 pages.
(Continued)

*Primary Examiner* — Robert Grant
*Assistant Examiner* — Tynese V McDaniel
(74) *Attorney, Agent, or Firm* — K&L Gates LLP

(57) ABSTRACT

There is provided a charging device including a charging voltage providing unit configured to provide a maximum charging voltage for an electricity storage unit, wherein the electricity storage unit includes a plurality of battery cells, and wherein the maximum charging voltage satisfies an equation (1) below: Maximum Charging Voltage=Total Battery Voltage+(Fully Charged Voltage−Maximum Cell Voltage)*n (1) wherein n represents a total number of the battery cells connected in series.

15 Claims, 13 Drawing Sheets

(51) Int. Cl.
*B60L 3/00* (2019.01)
*B60L 3/12* (2006.01)
*B60L 53/63* (2019.01)
*B60L 58/22* (2019.01)
*B60L 53/65* (2019.01)
*B60L 53/30* (2019.01)
*B60L 58/12* (2019.01)
*B60L 53/00* (2019.01)
*B60L 53/54* (2019.01)
*B60L 50/16* (2019.01)
*B60L 53/64* (2019.01)
*B60L 53/51* (2019.01)
*B60L 50/40* (2019.01)
*B60L 53/14* (2019.01)
*B60L 53/66* (2019.01)
*B60L 55/00* (2019.01)
*B60L 58/15* (2019.01)

(52) U.S. Cl.
CPC .............. *B60L 50/40* (2019.02); *B60L 53/00* (2019.02); *B60L 53/14* (2019.02); *B60L 53/30* (2019.02); *B60L 53/51* (2019.02); *B60L 53/54* (2019.02); *B60L 53/63* (2019.02); *B60L 53/64* (2019.02); *B60L 53/65* (2019.02); *B60L 53/665* (2019.02); *B60L 55/00* (2019.02); *B60L 58/12* (2019.02); *B60L 58/15* (2019.02); *B60L 58/22* (2019.02); *H02J 7/008* (2013.01); *H02J 7/0016* (2013.01); *H02J 7/0021* (2013.01); *H02J 7/045* (2013.01); *B60L 2200/12* (2013.01); *B60L 2210/30* (2013.01); *B60L 2210/40* (2013.01); *B60L 2240/545* (2013.01); *B60L 2240/547* (2013.01); *B60L 2240/549* (2013.01); *B60L 2240/70* (2013.01); *B60L 2250/16* (2013.01); *Y02E 60/721* (2013.01); *Y02T 10/70* (2013.01); *Y02T 10/7005* (2013.01); *Y02T 10/7022* (2013.01); *Y02T 10/7044* (2013.01); *Y02T 10/7055* (2013.01); *Y02T 10/7061* (2013.01); *Y02T 10/7077* (2013.01); *Y02T 10/7088* (2013.01); *Y02T 10/7241* (2013.01); *Y02T 10/7291* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 30/14* (2013.01)

(56) References Cited

U.S. PATENT DOCUMENTS

| | | | | |
|---|---|---|---|---|
| 2011/0169454 | A1* | 7/2011 | Maruyama | H01M 10/425 320/118 |
| 2012/0032647 | A1* | 2/2012 | Watanabe | H01M 4/5825 320/136 |
| 2012/0173179 | A1* | 7/2012 | Matsumoto | B60L 11/123 702/63 |
| 2013/0033790 | A1* | 2/2013 | Kobayakawa | H01M 10/44 361/87 |
| 2014/0342193 | A1* | 11/2014 | Mull | H01M 10/4257 429/50 |

FOREIGN PATENT DOCUMENTS

| | | |
|---|---|---|
| JP | 2009-225632 | 10/2009 |
| WO | 2013061461 | 5/2013 |

OTHER PUBLICATIONS

Chinese Office Action dated May 3, 2018 in corresponding Chinese Application No. 2015800168861.

Japan Patent Office, Office Action issued in Japanese Patent Appln. No. 2014-078088 (related to above-captioned patent application), dated Nov. 21, 2017.

Chinese Office Action dated Nov. 12, 2018 in corresponding Chinese Application No. 201580016886.1 (7 pages).

Chinese Office Action dated Apr. 16, 2019 in corresponding Chinese Application No. 201580016886.1 (5 pages).

Chinese Office Action dated Oct. 8, 2019 in corresponding Chinese Application No. 201580016886.1 (5 pages).

* cited by examiner

[Fig. 1]
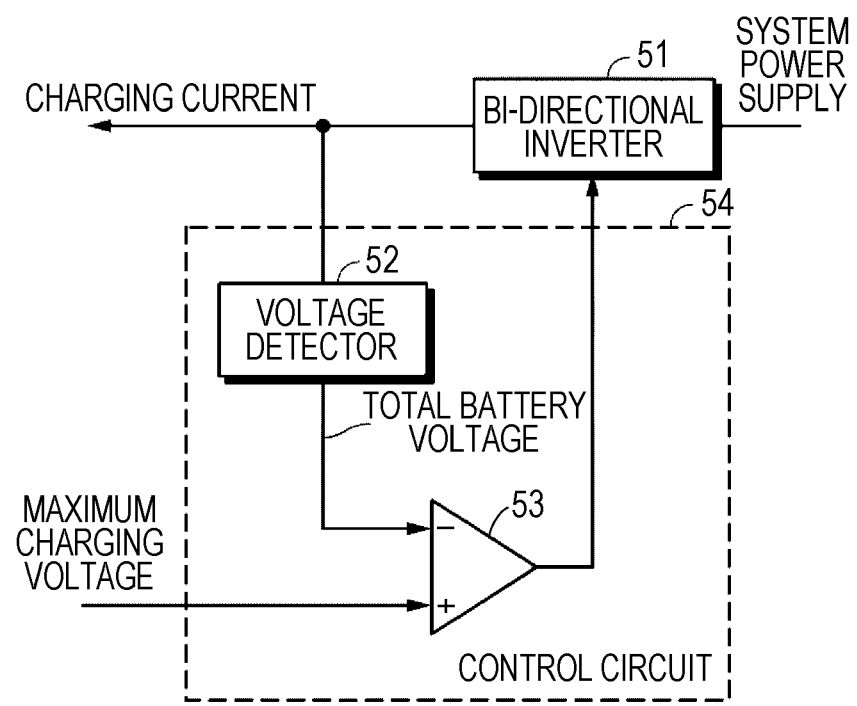

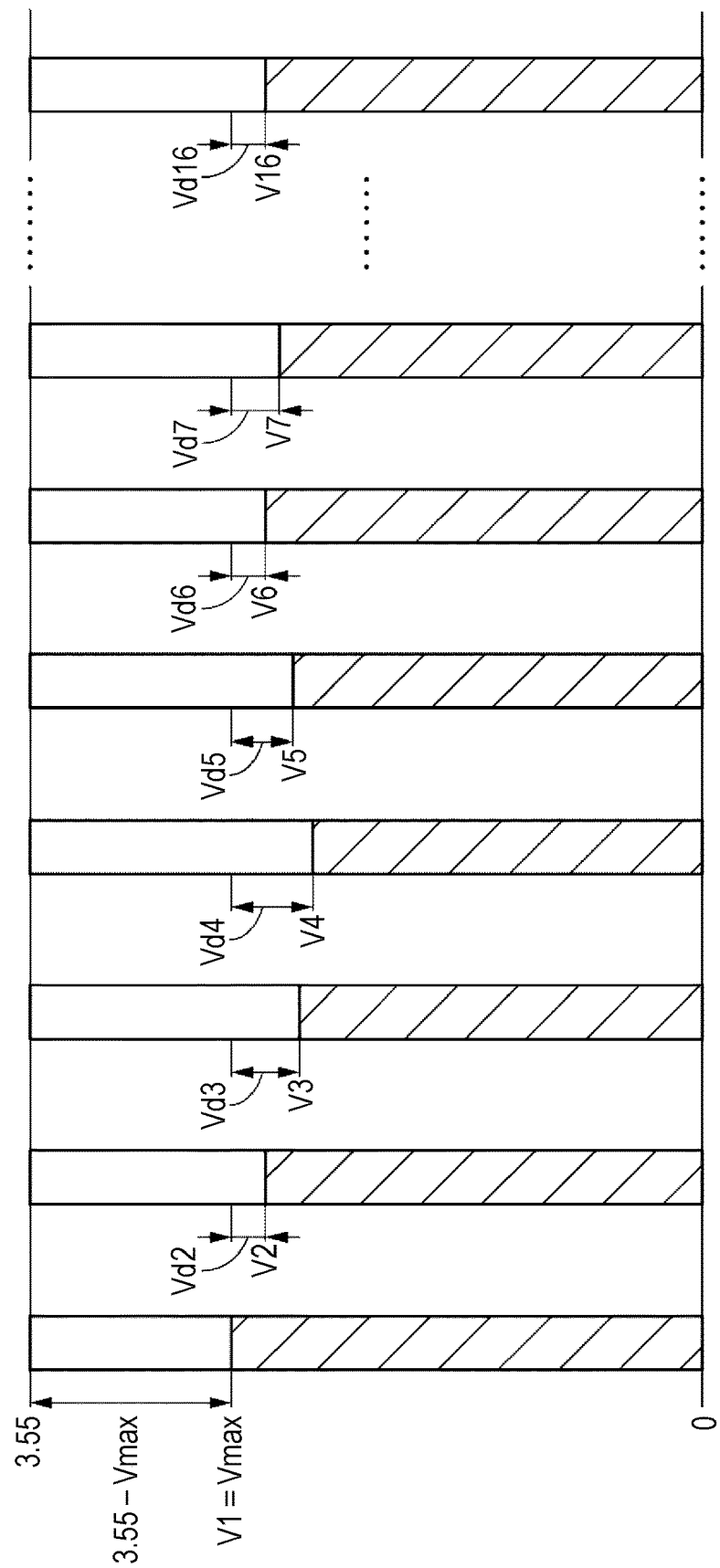
[Fig. 2]

[Fig. 3]
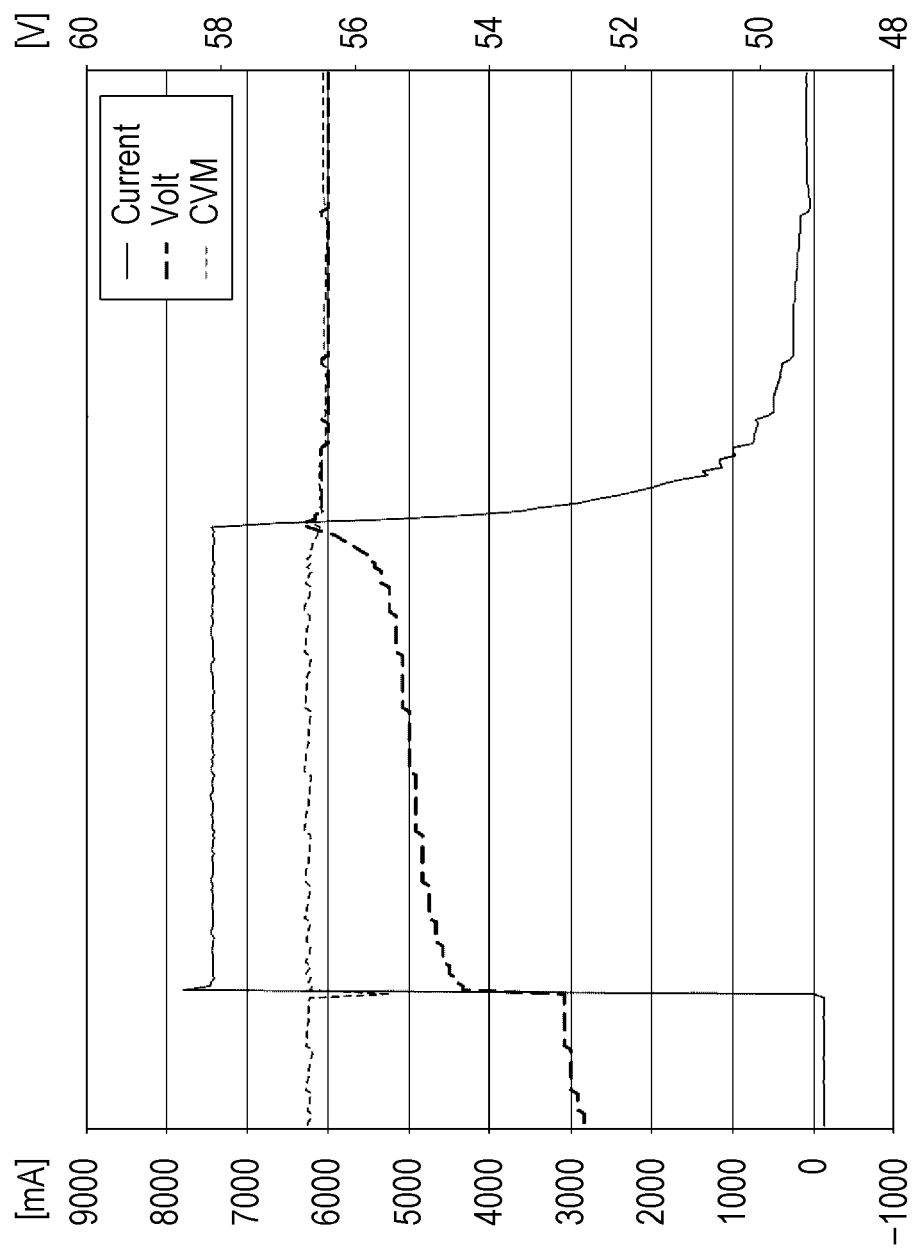

[Fig. 4]
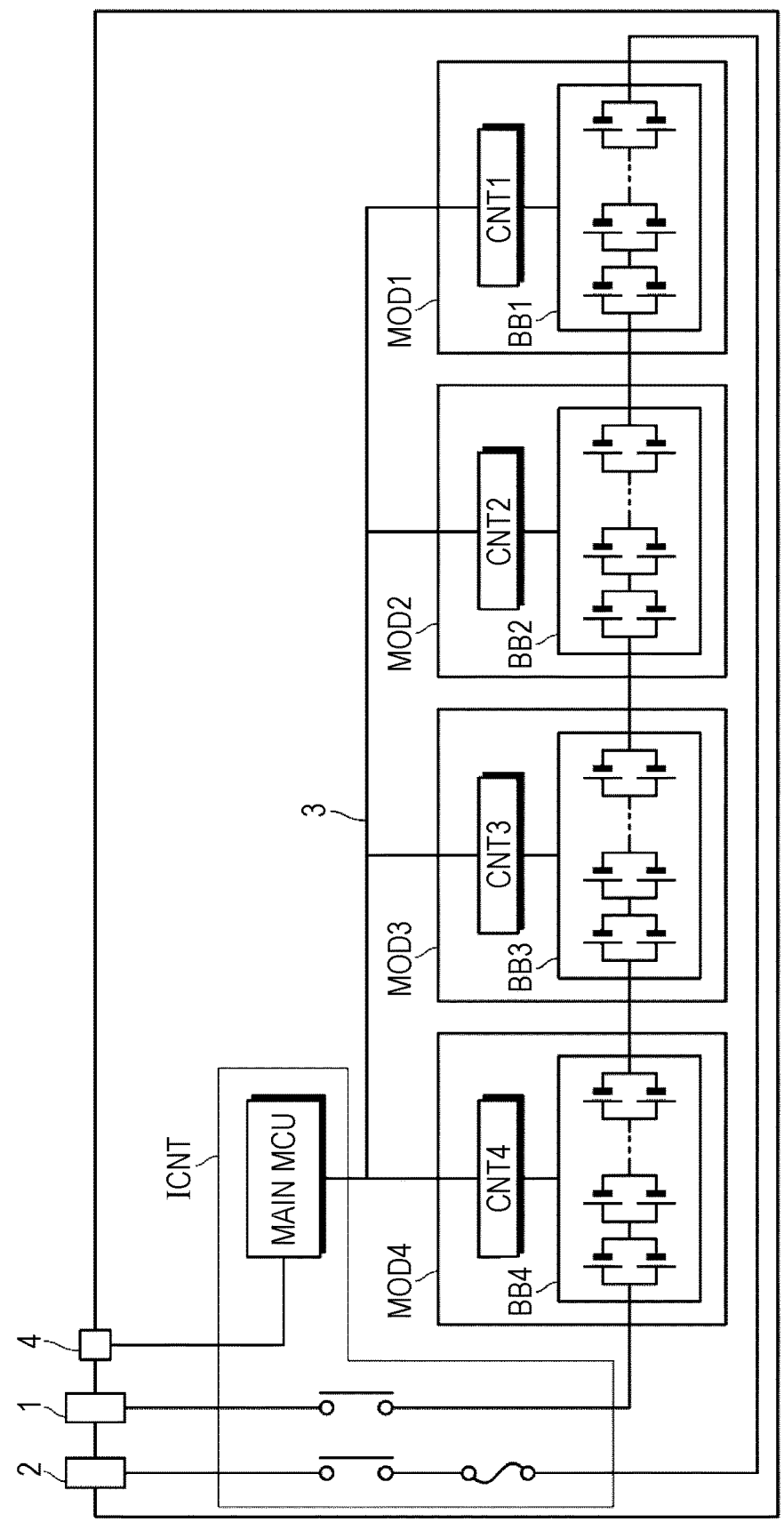

[Fig. 5]
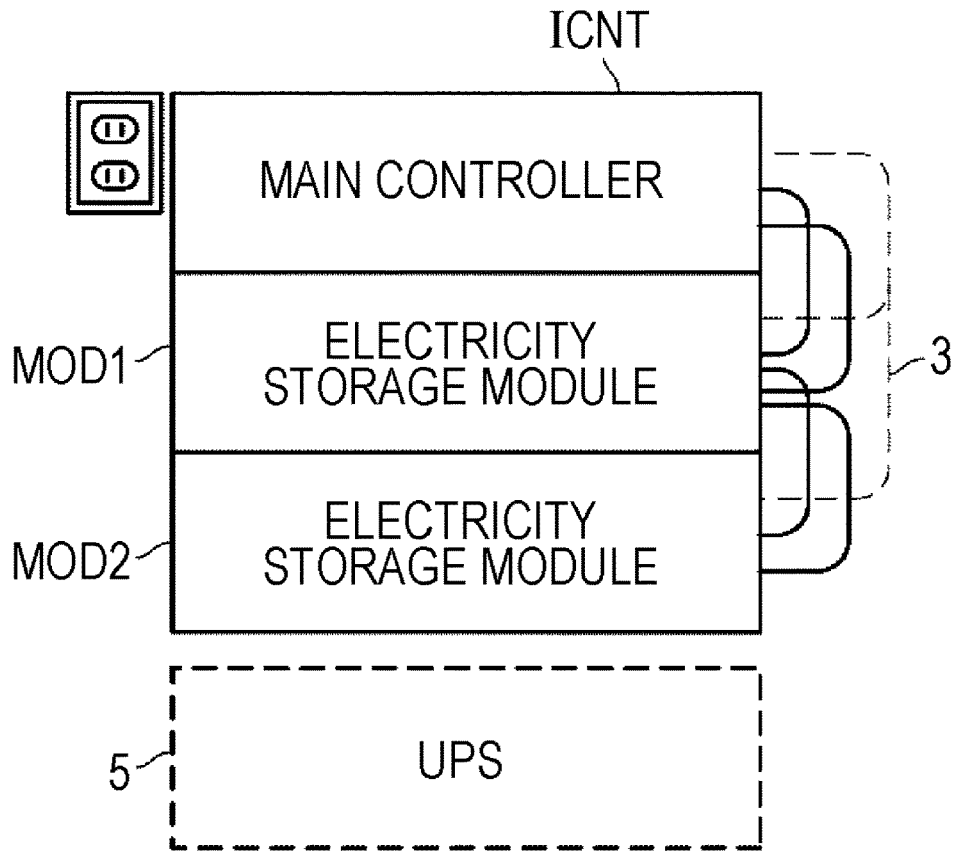
[Fig. 6]
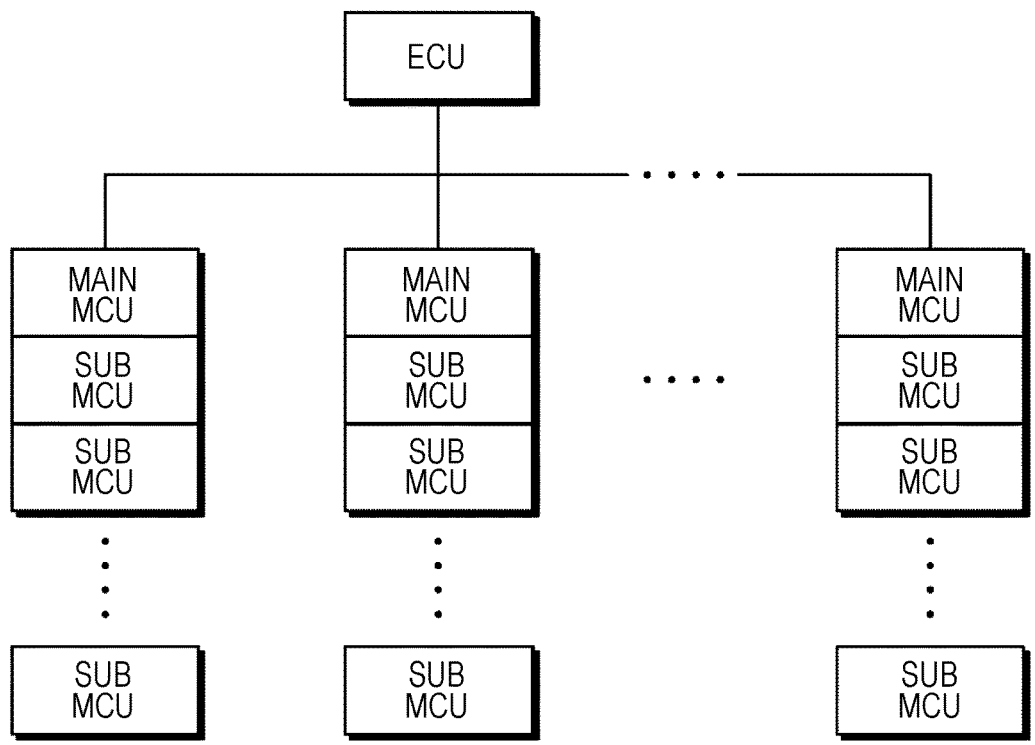

[Fig. 7]
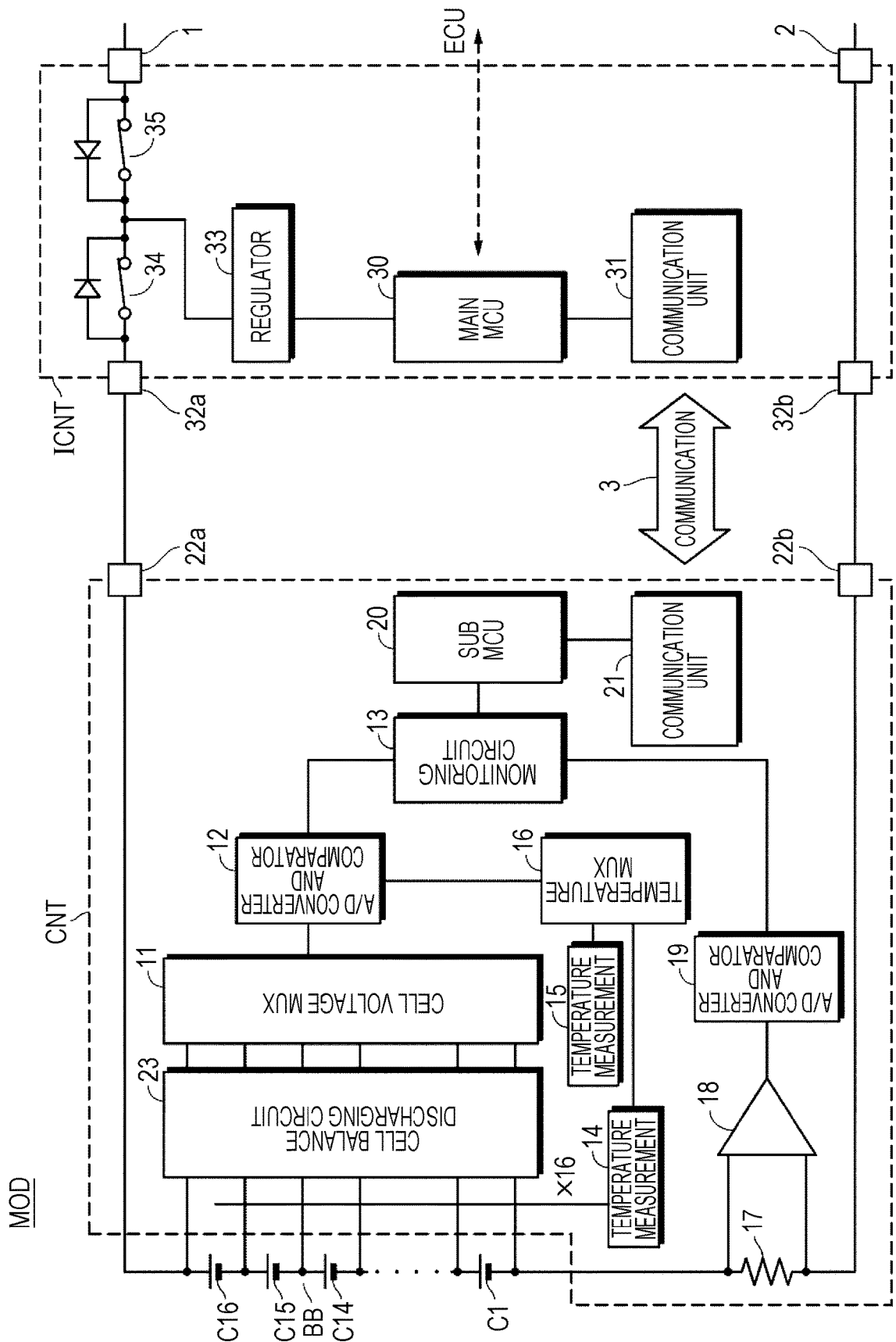

[Fig. 8]
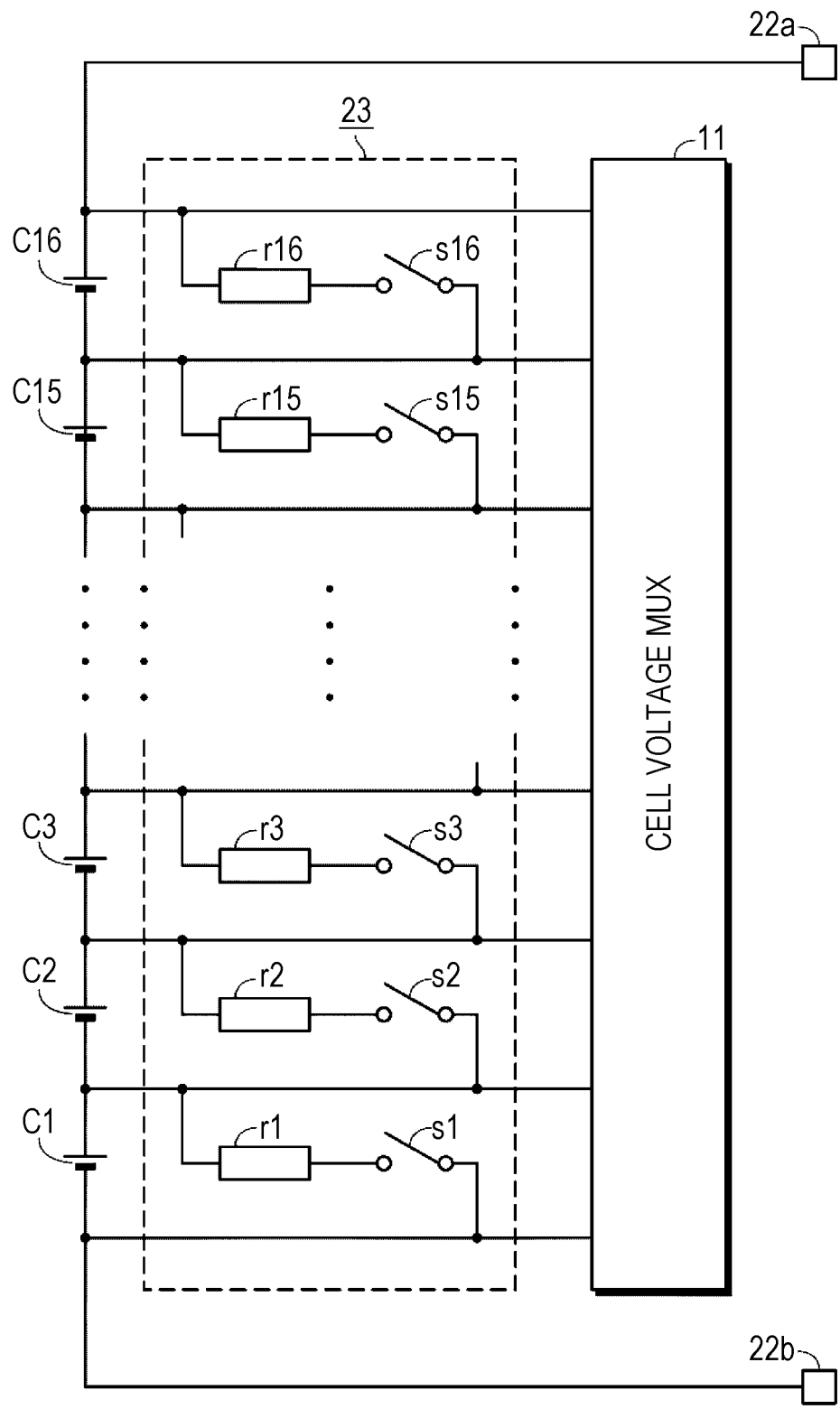

[Fig. 9]
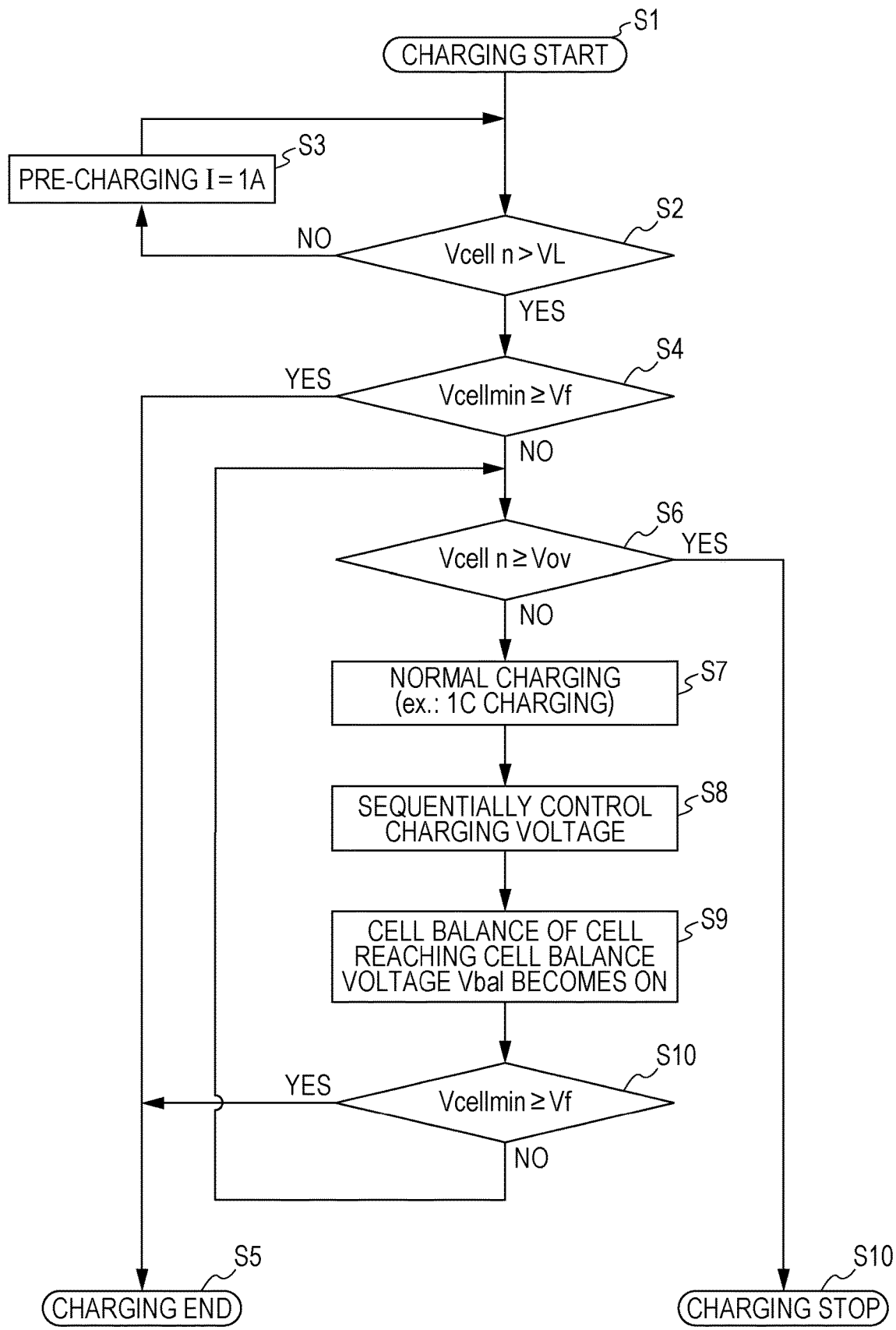

[Fig. 10]
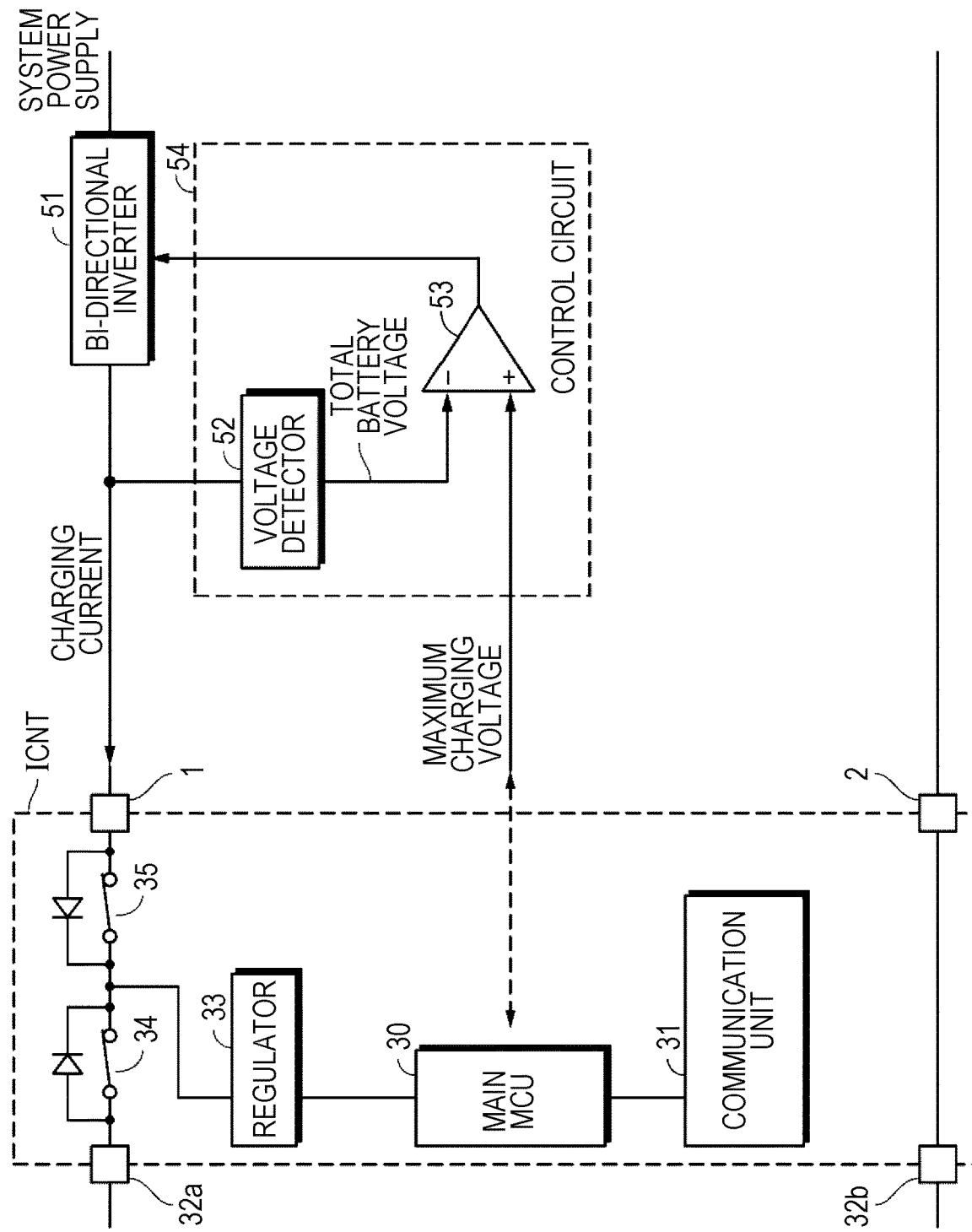

[Fig. 11]
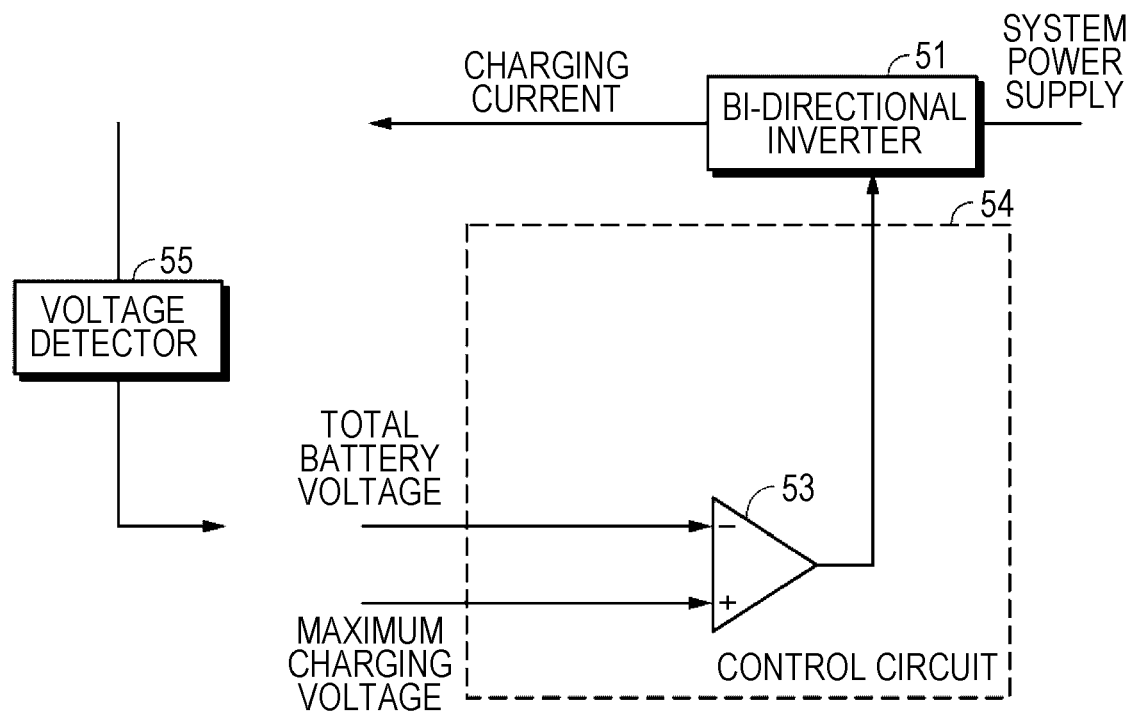

[Fig. 12]
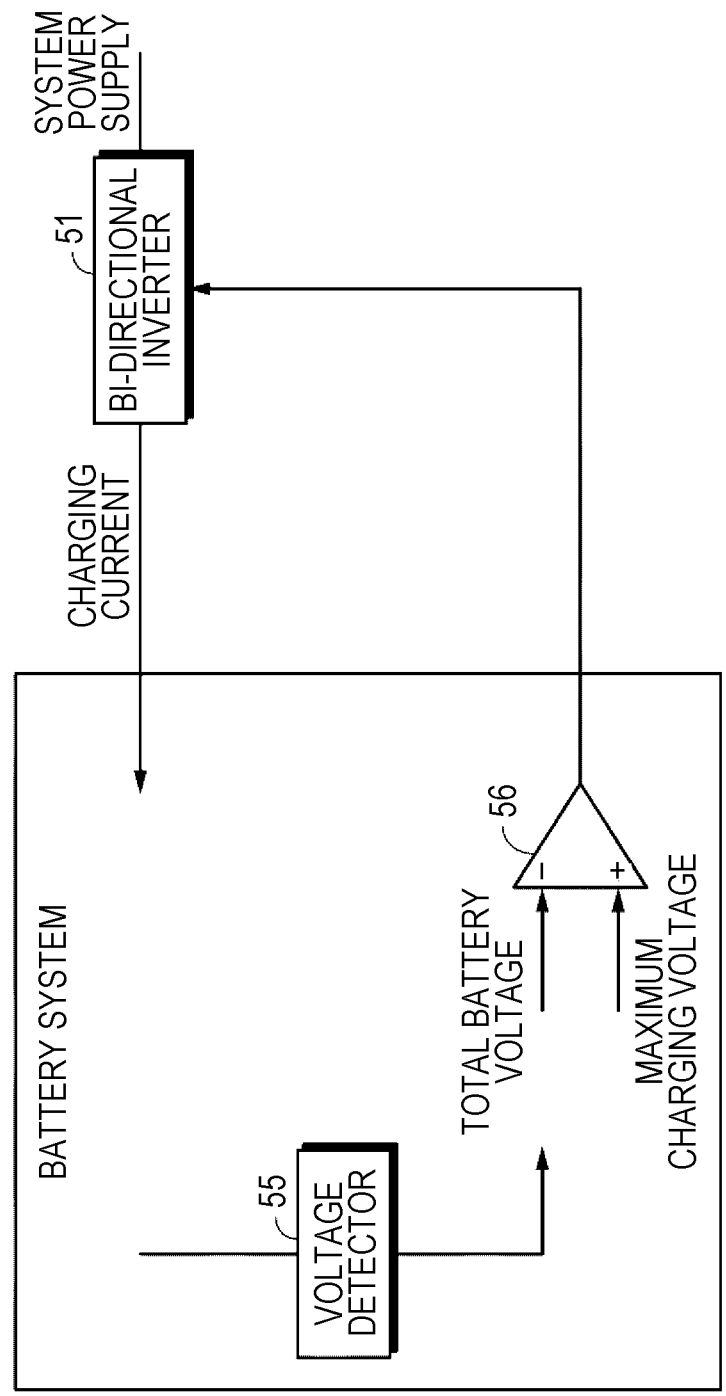

[Fig. 13]
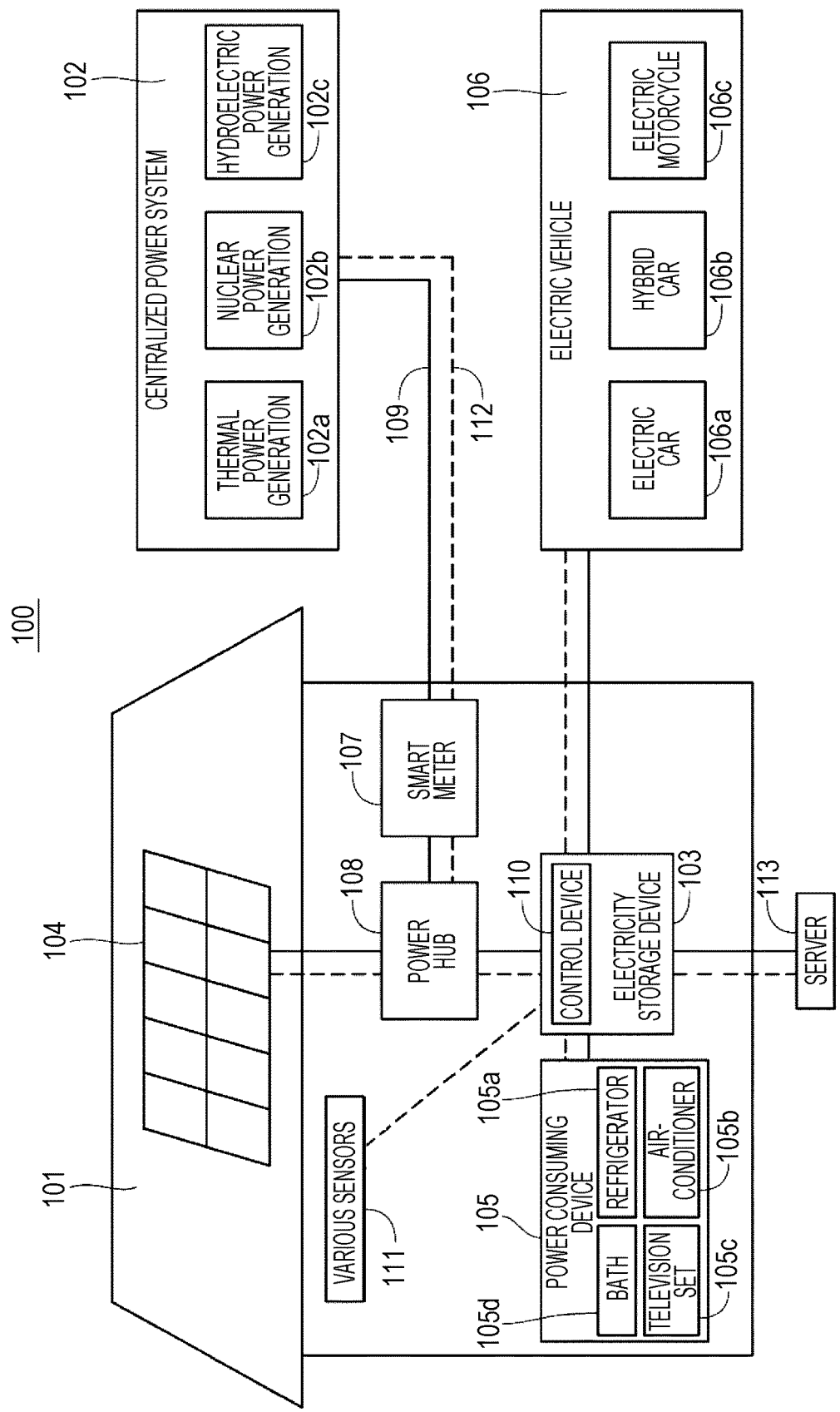

[Fig. 14]
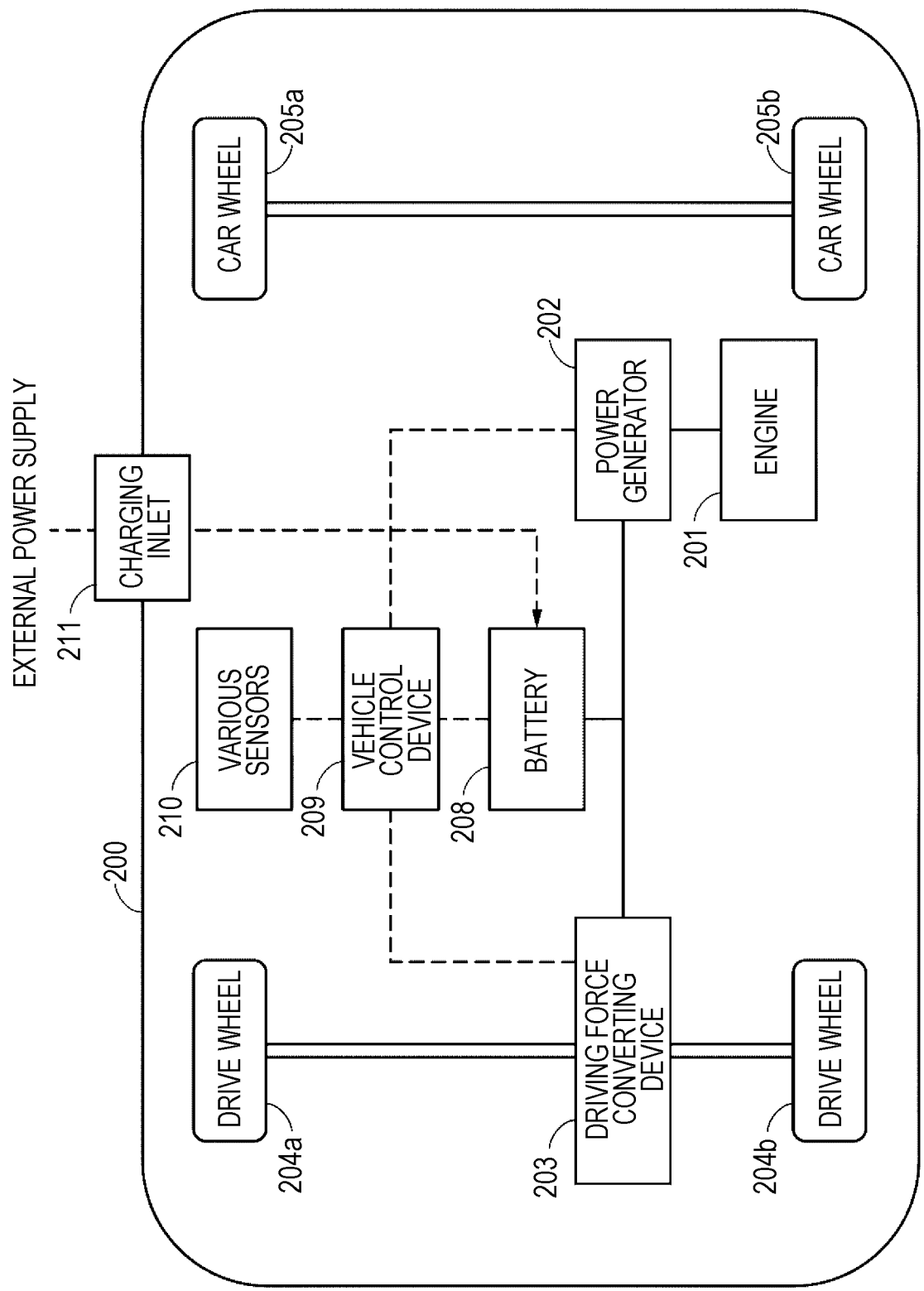

CHARGING DEVICE, CHARGING CONTROL METHOD, ELECTRICITY STORAGE DEVICE, POWER STORAGE DEVICE, POWER SYSTEM, AND ELECTRIC VEHICLE

CROSS REFERENCE TO RELATED APPLICATIONS

This application claims the benefit of International Application PCT/JP2015/001495, filed Mar. 18, 2015, which claims the benefit of Japanese Priority Patent Application JP 2014-078088 filed Apr. 4, 2014, the entire contents of which are incorporated herein by reference.

TECHNICAL FIELD

The present disclosure relates to a charging device, a charging control method, an electricity storage device, a power storage device, a power system, and an electric vehicle.

BACKGROUND ART

As one of the methods of charging a secondary battery, there is constant voltage charging. In this method, a constant voltage is applied from a charging unit to the secondary battery. In the charging starting period, large current flows, and in the charging ending period, the charging current becomes small. Recently, a high-voltage electricity storage device such as an electricity storage device of a house or the like and a battery for an electric car has been used, and a battery system having, as a unit, a battery pack which is configured by serial connection of secondary batteries (appropriately referred to as battery cells) or sub modules (sometimes, referred to as battery blocks) configured by parallel connection of a plurality of battery cells has been used.

For example, a battery pack configured by serial connection of a predetermine number (for example, 16) of battery cells may be charged by constant voltage charging. In this case, the charging is performed until the voltage of the entire battery pack is substantially equal to a charging voltage. In the battery cells included in the battery pack, there is a variation in characteristics. Therefore, the voltages of the battery cells are not equally increased.

In the case of charging the battery pack configured by serial connection of battery cells, it is necessary to prevent the battery cells from being over-charged. For example, PTL 1 discloses a charging device which prevents over-charging. As disclosed in PTL 1, the charging device monitors each voltage of serially-connected battery cells, and if a voltage of any one of the battery cells reaches a predetermined voltage, for example, 4.2 V (maximum charging voltage of a lithium ion secondary battery), the charging device decreases the charging current stepwise.

CITATION LIST

Patent Literature

PTL 1: JP 2005-151683 A

SUMMARY

Technical Problem

When the voltage of battery pack reaches a set voltage, cell balancing is performed so as to cope with the variation of the battery cells. In this charging method or the charging method disclosed in PTL 1, there is a problem in that since the charging voltage is constant, a charging time is increased or charging is not surely performed up to a fully charged voltage.

Therefore, the present disclosure is to provide a charging device, a charging control method, an electricity storage device, a power storage device, a power system, and an electric vehicle capable of shortening a charging time and surely performing charging up to a fully charged voltage.

Solution to Problem

The present disclosure provides a charging device including a charging voltage providing unit configured to provide a maximum charging voltage for an electricity storage unit, wherein the electricity storage unit includes a plurality of battery cells, and wherein the maximum charging voltage satisfies an equation (1) below:

$$\text{Maximum Charging Voltage} = \text{Total Battery Voltage} + (\text{Fully Charged Voltage} - \text{Maximum Cell Voltage})*n \quad (1)$$

wherein n represents a total number of the battery cells connected in series.

The present disclosure provides a charging control method including providing a maximum charging voltage for an electricity storage unit by a charging voltage providing unit, wherein the electricity storage unit includes a plurality of battery cells, and wherein the maximum charging voltage is provided and satisfies an equation (1) below:

$$\text{Maximum Charging Voltage} = \text{Total Battery Voltage} + (\text{Fully Charged Voltage} - \text{Maximum Cell Voltage})*n \quad (1)$$

wherein n represents a total number of the battery cells connected in series.

The present disclosure provides an electricity storage device including:

an electricity storage unit including a plurality of battery cells and a charging voltage providing unit configured to provide a maximum charging voltage for the electricity storage unit, wherein the maximum charging voltage satisfies an equation (1) below:

$$\text{Maximum Charging Voltage} = \text{Total Battery Voltage} + (\text{Fully Charged Voltage} - \text{Maximum Cell Voltage})*n \quad (1)$$

wherein n represents a total number of the battery cells connected in series.

The present disclosure provides a power storage device including an electricity storage device according to an embodiment of the present disclosure includes the above-described electricity storage device.

An electric vehicle or a power system according to an embodiment of the present disclosure includes the above-described electricity storage device.

Advantageous Effects of Invention

According to at least one embodiment, it is possible to shorten a time necessary for completion of charging. In addition, the effects listed herein are not necessarily limited, but any of the effects listed in the present disclosure may be included.

BRIEF DESCRIPTION OF DRAWINGS

FIG. 1 is a block diagram illustrating a first embodiment of the present disclosure.

FIG. 2 is a schematic diagram used for illustrating the first embodiment of the present disclosure.

FIG. 3 is a graph used for illustrating the first embodiment of the present disclosure.

FIG. 4 is a block diagram illustrating an example of a power storage device to which the present disclosure can be adapted.

FIG. 5 is a schematic diagram illustrating an example of an outer appearance in the case of using the power storage device.

FIG. 6 is a block diagram illustrating a relationship between controllers in the power storage device.

FIG. 7 is a block diagram illustrating a control unit of an electricity storage module to which the present disclosure can be adapted.

FIG. 8 is a connection diagram of a cell balance discharging circuit to which the present disclosure can be adapted.

FIG. 9 is a flowchart illustrating a flow of a control process of a control unit to which the present disclosure can be adapted.

FIG. 10 is a block diagram illustrating a second embodiment of the present disclosure.

FIG. 11 is a block diagram illustrating a modified example of the present disclosure.

FIG. 12 is a block diagram illustrating another modified example of the present disclosure.

FIG. 13 is a block diagram illustrating a first application example of the present disclosure.

FIG. 14 is a block diagram illustrating a second application example of the present disclosure.

DESCRIPTION OF EMBODIMENTS

Embodiments described hereinafter are appropriate, specific examples of the present disclosure, and various preferred technical limitation are added thereto. However, the scope of the present disclosure is not limited to the embodiments in the description hereinafter if there is no specific notification that the present disclosure is limited. The present disclosure will be described in the following order.

<1. First Embodiment>
<2. Second Embodiment>
<3. Modified Example>
<4. Application Example>

1. First Embodiment

A first embodiment of the present disclosure will be described with reference to FIG. 1. A bi-directional inverter indicated by 51 is connected between a system power supply and a battery system which is an electricity storage unit. The bi-directional inverter 51 is an example of a charging current generation circuit, and a configuration other than the bi-directional inverter may be available. The battery system is configured to include a battery pack where, for example, 16 battery cells are connected in series. In another example of the battery pack, a parallel connection of the plurality of battery cells may be used instead of a single battery cell, and a plurality of the parallel connections are connected in series. The present disclosure may be adapted to any of the battery packs.

In the first embodiment of the present disclosure, an example of a secondary battery in use is a lithium ion secondary battery including a positive electrode active material and a negative electrode active material of a carbon material such as graphite, and the positive electrode active material having an olivine structure is contained as a positive electrode material.

The bi-directional inverter 51 has a function of converting DC power generated in the battery system into AC power and supplying the AC power to the system power supply and a function of generating DC power for charging the battery system from the system power supply. Herein, the case of forming the DC power for charging from the system power supply will be described.

A voltage of an output terminal of the bi-directional inverter 51 is detected by a voltage detector 52. The voltage is a total battery voltage of the battery pack. The detected total battery voltage is supplied to a comparison operator 53 as the one-side input thereof. A maximum charging voltage is supplied as the other-side input of the comparison operator 53. Charging control (CV (constant voltage) control) is performed based on the maximum charging voltage. The voltage detector 52 and the comparison operator 53 constitute a control circuit 54.

A difference voltage between the maximum charging voltage and the total battery voltage is output from the comparison operator 53. The output of the comparison operator 53 is supplied to the bi-directional inverter 51 as a control signal. The bi-directional inverter 51 supplies the charging current corresponding to the output of the comparison operator 53 to the battery system. Since the CV control is performed based on the maximum charging voltage, the charging current is decreased according to the increase in battery voltage.

As an example, if the number of serial connections in the battery pack is set to n=16 and the possible maximum voltage per unit cell is set to 3.55 V, the control of the control circuit 54 is expressed by the following Equation (1). The maximum voltage is a fully charged voltage. In a cobalt based battery, the voltage becomes 4.2 V. Maximum Charging Voltage=Total Battery Voltage+(3.55−Maximum Cell Voltage)*16 (1)

This relationship can be illustrated in FIG. 2. For example, the voltage V1 of the first battery cell is set to the maximum cell voltage Vmax. If the difference voltages of the battery cells with respect to the maximum cell voltage Vmax are denoted by Vd2, Vd3, Vd4, . . . , Vdn, the total battery voltage can be expressed by the following Equation.

Total Battery Voltage=$V1+V2+V3+V4+\ldots+V16=V$max$+(V$max$-Vd2)+(V$max$-Vd3)+\ldots+(V$max$-Vd16)$ Therefore, the right handed side of Equation (1) is expressed as follows.

Right Handed Side=$V$max$+(V$max$-Vd2)+(V$max$-Vd3)+\ldots+(V$max$-Vd16)+(3.55*16)-(V$max$*16)=56.8-(Vd2+Vd3+\ldots+Vd16)$ (2)

As can be understood from Equation (2), in the first embodiment of the present disclosure, the maximum charging voltage is set by decreasing by only a variation amount between the battery cells from 56.8 V. In the charging period, the charging continues to be performed based on the changed charging voltage which is obtained by decreasing by the sum value of the variation voltages between the cells from the charging set voltage (3.55 V*16=56.8 V), and when the voltage reaches the charging set voltages of the individual cells, the charging is ended.

In the case where the variation amount between the cells is zero, the voltage is set to 56.8 V (this voltage is the maximum set value). In addition, in the case where the maximum cell voltage Vmax exceeds 3.55 V, the term (3.55−Maximum Cell Voltage) has a minus value, and thus, the control is performed so that the maximum charging voltage (charging current) is decreased. Therefore, it is possible to prevent the battery cells from being overcharged.

Particularly, the present disclosure is appropriately adapted to a secondary battery containing the positive electrode active material having an olivine structure as a positive electrode material. In the battery pack using this kind of the secondary battery, as illustrated in FIG. 3, in some cases, in the charging ending period, the total battery voltage may be increased. In the present disclosure, in this case, the maximum charging voltage (CVM in FIG. 3) is controlled to be decreased. Therefore, it is possible to prevent the total battery voltage from being excessively large. In addition, in the charging starting period in FIG. 3, the current is set to have a constant current value by current limitation of the bi-directional inverter 51. If the variation between the cells is increased in the charging ending period, the charging voltage is controlled to be small, so that the battery voltage is also increased. Therefore, spontaneously, the charging current is set to be small. The determination of the completion of the charging is made based on whether the minimum battery voltage of the cell is a predetermined voltage Vf or more.

In the first embodiment, the sum value $\Sigma\delta$ of the variation amounts between the battery cells is compared with a threshold value $\Delta V$, and in the case of ($\delta V < \Delta V$) (within the scope of the threshold value), a switching operation for current limitation may be performed.

2. Second Embodiment

Power Storage Device

Next, a second embodiment where the present disclosure is adapted to a power storage device will be described. First, an example of the power storage device will be described. In the case of using a large number of electricity storage elements, for example, battery cells in order to generate large power, a configuration where a plurality of electricity storage units (hereinafter, referred to as electricity storage modules) are connected and a control device is installed to be common to the electricity storage modules is employed. The configuration is referred to as a power storage device. In addition, a power storage system where a plurality of the power storage devices are connected is also available. As the electricity storage element, besides the battery, a capacity or the like may be used.

The electricity storage module is an electricity storage device including an electricity storage unit and is an unit where the electricity storage unit including a serial connection of a plurality of battery cells, for example, lithium ion secondary batteries or a serial connection of parallel connections (sub modules) of a plurality of battery cells and module controllers installed for the respective modules are combined. Sub-microcontroller units of the module controllers are connected to a main microcontroller unit of a main controller which is a whole control device through a data transmission line (bus), so that the main microcontroller unit performs control such as charging control, discharging control, control for suppressing deterioration. As the bus, for example, I2C (Inter-Integrated Circuit) type communication is used.

In this method, serial communication is performed with respect to a device which is directly connected in a relatively short distance. One master and one or a plurality of slaves are connected to each other through two lines. Based on crosstalk transmitted through the one line as a reference, data signals are transmitted through the other line. The individual slaves have addresses, and the data include the addresses. The data are transmitted while the master and the slaves take confirmation from each other by returning acknowledgment from the receiver side for each byte. In the case of the power storage device, the main microcontroller unit becomes the master, and the sub-microcontroller units become the slaves.

Data are transmitted from the sub-microcontroller units of the module controllers to the main microcontroller unit. The battery information, for example, information of an internal state of each electricity storage module, that is, information of a voltage of each battery cell, a voltage of the entire module, information of a current, information of a temperature, and the like is transmitted from the sub-microcontroller units to the main microcontroller unit, so that the charging and discharging processes of each electricity storage module are managed.

FIG. 4 illustrates an example of a specific connection configuration of the power storage device. For example, four electricity storage modules MOD1 to MOD4 are connected in series. In this case, the entire output voltage, for example, about 200 V of the power storage device is extracted in a positive terminal 1 (VB+) and a negative terminal 2 (VB−). The electricity storage modules MOD1 to MOD4 include respective module controllers CNT1 to CNT4 and respective electricity storage units BB1 to BB4 where a plurality of parallel connections of a plurality of battery cells or a plurality of sub modules are connected. The electricity storage units BB1 to BB4 are connected through the power supply line.

As described later, each module controller includes a monitoring circuit, a sub control unit, and the like. The main controller ICNT and the module controllers CNT1 to CNT4 are connected through a bus 3 of common serial communication. Battery information on voltage or the like of the module from each module controller is transmitted to the main controller ICNT. In addition, the main controller ICNT has a communication terminal 4 so as to enable communicating with an external unit, for example, an electronic control unit.

As illustrated in FIG. 5, for example, the two electricity storage modules MOD1 and MOD2 and the main controller ICNT constitute box-shaped cases, which are used in a stacked state. In some cases, as an option, a UPS (Uninterruptable Power Supply: UPS device) 5 is used. As indicated by a broken line in FIG. 5, the main controller ICNT and the module controllers CNT of the electricity storage modules are connected through the bus 3.

In addition, as illustrated in FIG. 6, in the power storage device, in order to control the electricity storage modules, sub control units (in this figure, denoted by SUB MCU) of the electricity storage modules are connected to main microcontroller units (in this figure, denoted by MAIN MCU). In addition, the main microcontroller units are connected to a highest-level electronic control unit (in this figure, denoted by ECU). In general, the electronic control unit is intended to generically denote a unit which controls an analog device.

Example of Module Controller and Main Controller

An example of a configuration of the module controller CNT and the main controller ICNT will be described with reference to FIG. 7. An electricity storage unit BB is configured with a serial connection of n battery cells, for example, 16 battery cells C1 to C16 (hereinafter, simply referred to as cells). The electricity storage unit BB may also have a configuration where parallel connections (sub modules) of a plurality of the cells are connected in series. The voltage of each cell is supplied to a cell voltage multiplexer 11, and the voltages of the cells C1 to C16 are sequentially selected and supplied to an A/D converter and comparator 12. In addition, a cell balance discharging circuit 23 for discharging each of the cells C1 to C16 under the cell balance control is installed.

The voltages of the 16 cells are time-division-multiplexed by the cell voltage multiplexer 11 and are converted into digital signals by the A/D converter and comparator 12 to be compared with a voltage threshold value. The A/D converter and comparator 12 outputs 14- to 18-bit digital voltage data of each cell and a result (for example, a 1-bit signal) of comparison of the voltage of each cell and the voltage threshold value. The output signal of the A/D converter and comparator 12 is supplied to the monitoring circuit 13.

In addition, a temperature measurement unit 14 which measures a temperature of each cell and a temperature measurement unit 15 which measures a temperature inside the IC are installed. The temperature information from the temperature measurement units 14 and 15 is supplied to a temperature multiplexer 16. The temperature data multiplexed by the temperature multiplexer 16 are supplied to the A/D converter and comparator 12. The A/D converter and comparator 12 generate digital temperature data and outputs a comparison result (for example, a 1-bit signal) obtained by comparing the digital temperature data with the temperature threshold value. As described above, the A/D converter and comparator 12 also outputs a comparison result with respect to the cell voltage data. Separate A/D converter and comparator may be installed for temperature.

A resistor 17 which detects a current flowing the electricity storage units (cells C1 to C16) is connected in series to the electricity storage unit BB. The voltage across the resistor 17 is supplied through an amplifier 18 to an A/D converter and comparator 19. The A/D converter and comparator 19 outputs digital current data and a comparison result (for example, a 1-bit signal) obtained by comparing a current value and a current threshold value. The output signal of the A/D converter and comparator 19 is supplied to the monitoring circuit 13.

The 1-bit signal output by the A/D converter and comparator 12 is a detection signal representing normality/abnormality of the voltage of each cell. In the charging period, the voltage of each cell is compared with a predetermined value, and a detection signal representing whether or not the voltage is an over-voltage OV is generated. In the discharging period, the voltage of each cell is compared with a predetermined value, and a detection signal representing whether or not the voltage is an under-voltage UV is generated. In addition, another 1-bit signal output by the A/D converter and comparator 12 is a detection signal representing an over-temperature OT. Another 1-bit signal output by the A/D converter and comparator 19 is a detection signal representing an over-current OC.

The above-described detection signals, the data of the voltage value, the data of the current value, and the data of the temperature are supplied from the monitoring circuit 13 to the sub-microcontroller unit 20. The monitoring circuit 13 and the sub-microcontroller unit 20 are connected to each other through, for example, serial communication. The sub-microcontroller unit 20 performs a diagnosis process for the module controller CNT by using the received detection signals as needed. The detection signal output from the sub-microcontroller unit 20 and the data representing the result of the diagnosis process are supplied to the communication unit 21.

The communication unit 21 is an interface for performing serial communication, for example, I2C communication with the main microcontroller unit of the main controller ICNT through the bus 3. In addition, as a communication method, a wired or wireless communication line may be used. Although not shown in FIG. 7, the sub-microcontroller units of the module controllers of the other electricity storage modules are connected to the bus 3.

A positive terminal 22a and a negative terminal 22b of the electricity storage module MOD are connected to a positive terminal 32a and a negative terminal 32b of the main controller ICNT through the respective power supply lines.

The communication unit 31 of the main controller ICNT is connected to the bus 3. The main microcontroller unit 30 is connected to the communication unit 31, so that the communication performed through the communication unit 31 is controlled by the main microcontroller unit 30. In addition, the main microcontroller unit 30 is connected to an upper-level electronic control unit ECU through the communication line.

The power supply voltage generated by a regulator 33 is supplied to the main microcontroller unit 30. The main controller ICNT has a positive terminal 1 and a negative terminal 2. The switching units 34 and 35 are inserted in series in the output line of the power supply, and the switching units 34 and 35 are controlled by the main micro-controller unit 30. Each of the switching units 34 and 35 is configured to include a switch element (FET (Field Effect Transistor), an IGBT (Insulated Gate Bipolar Transistor), and the like, and parallel-connected diodes.

In the charging-prohibited period, the switching unit 34 is turned off. In the discharging-prohibited period, the switching unit 35 is turned off. In addition, in the case of not performing the charging and discharging, the switch element of each of the switching units 34 and 35 is turned off. The main microcontroller unit 30 transmits the data received from the electricity storage module MOD to the upper-level electronic control unit ECU. In addition, a control signal about charging/discharging is received from the electronic control unit ECU.

Cell Balance Discharging Circuit

An example of the cell balance discharging circuit 23 is illustrated in FIG. 8. A resistor r1 and a switch s1 are connected in parallel to the cell C1. Similarly, resistors r2 to r16 and switches s2 to s16 are connected in parallel to the respective cells C2 to C16. The switches s1 to s16 are configured with semiconductor switch elements, for example, FETs.

The turning on and off of the switches s1 to s16 are controlled, for example, by a switching control signal generated in the sub-microcontroller unit 20. When the switches s1 to s16 are turned on, the positive and negative electrodes of the cells C1 to C16 are connected through the resistors r1 to r16, so that the charges stored in the cells C1 to C16 are discharged. In the period when the charging current is supplied to the cells C1 to C16, the switches s1 to s16 are turned on, and thus, the charging current is shunted, so that the charging current is substantially decreased. For example, during the charging period, the turned-on switch continues to be in the ON state.

A charging circuit is connected to the positive terminal 1 and the negative terminal 2, so that the cells C1 to C16 are charged. The charging is performed with a constant current. In the present disclosure, the charging current is allowed to be decreased stepwise. Namely, during the charging, the voltage of each cell is monitored by the monitoring circuit 13. If any of the cells reaches a set current switching voltage V1, the current is decreased by one step, and the switch (cell balance discharging circuit 23) corresponding to the cell which reaches the current switching voltage V1 is turned on, so that the increase in voltage is suppressed. This operation is repetitively performed, and at a predetermined total voltage or if almost the entire cells reaches the fully charged voltage Vf, the charging is stopped.

Control Operation

A control process performed by the sub-microcontroller unit 20 in the charging period will be described with reference to a flowchart of FIG. 9.

Vcelln: an n-th cell

Vcellmin: a minimum voltage among the n cells

Vov: a charging pause voltage

Vf: a fully charged voltage

Vcellov: a voltage of a cell among the n cells which reaches the charging pause voltage VL: a discharging voltage As an example, it is set that Vov>Vf, it is set that Vov=4.15 V, and it is set that Vf=4.5 V. The voltage being higher than the Vov, for example, 4.2 V or more is treated as an over-charging voltage, the charging is prohibited. In addition, the discharging voltage VL is set to 3.0 V. The voltage lower than the VL, for example, 2.3 V is treated as an over-discharging voltage, the discharging is prohibited. Actually, each voltage is set so as to have a somewhat width. In the present disclosure, an example of the secondary battery in use is a lithium ion secondary battery including a positive electrode active material and a negative electrode active material of a carbon material such as graphite. Although there is no limitation as the positive electrode material, the positive electrode material containing a positive electrode active material having an olivine structure may be used. In such a type of the battery, for example, the Vov is set to 3.48 V, and the VL is set to 2.0 V.

In step S1, the charging is started. In step S2, it is determined whether or not Vcelln>VL. It is determined whether or not the voltages of all the cells are larger than the VL. In step S3, if it is determined that the condition of the step S2 is not satisfied, pre-charging is performed. The charging current of the pre-charging is set to, for example, 1 A. The pre-charging continues to be performed until the result of determination of the step S2 is affirmative.

In step S4, if the result of the determination of the step S2 is affirmative is affirmative, it is determined whether or not Vcellmin≥Vf.

In step S5, in the case where the result of the step S4 is affirmative, the charging is completed.

In step S6, in the case where the result of the step S4 is negative, it is determined whether or not Vcelln≥Vov. In the case where the result of the step S6 is affirmative, the process proceeds to step S10 where the charging is ended.

In step S7, normal charging is performed. For example, 1C charging is performed. The 1C charging is a current value by which a battery having a nominal capacity is charged at a rated value in order for the charging to be ended in one hour (1 h). For example, in the case of a lithium ion secondary battery having a nominal capacity of 2.0 Ah, the 1C charging is 1C=2.0 Ah/1 h=2.0 A.

In step S8, the charging voltage is sequentially controlled.

In step S9, only for the cell which reaches the cell balance voltage Vbal, the cell balancing is turned ON. Namely, in the cell balance discharging circuit 23, the switch for the corresponding cell is turned ON. Namely, the cell balance control is performed in parallel. Although the cell of which the cell balancing is turned ON reaches the next current switching voltage Vn, any particular process is not performed.

In step S10, it is determined whether or not the minimum voltage of the cell is Vf or more. In the case where the result of the determination is affirmative, the charging is completed (step S5). If not, the process returns to the step S6.

FIG. 10 illustrates a configuration of the second embodiment where the present disclosure is applied to the above-described power storage device. Similarly to the first embodiment, the bi-directional inverter 51 is inserted between the system power supply and the positive terminal 1 of the main controller ICNT. The voltage detector 52 and the comparison operator 53 constitute the control circuit 54.

Information of the maximum charging voltage is supplied to the comparison operator 53 through communication from the main microcontroller unit 30 of the main controller ICNT. Similarly to the first embodiment, by the control circuit 54, the maximum charging voltage is set by decreasing by only a battery variation amount between the battery cells from 56.8 V. In the charging period, if the voltage reaches a predetermined voltage, the charging continues to be performed based on the changed charging voltage which is obtained by decreasing by the sum value of the variation voltages between the cells from the charging set voltage, and when the voltage reaches the charging set voltage of the individual cells, the charging is ended.

Similarly to the first embodiment, in the second embodiment, in the case where the variation amount between the cells is zero, the voltage is set to 56.8 V (this voltage is the maximum set value). In the case where the maximum cell voltage Vmax exceeds 3.55 V, the term (3.55−Maximum Cell Voltage) has a minus value, and thus, the control is performed so that the maximum charging voltage (charging current) is decreased. Therefore, it is possible to prevent the battery cells from being over-charged. In addition, in the charging ending period, in the case where the total battery voltage is increased, the maximum charging voltage is controlled to be decreased. Therefore, it is possible to prevent the total battery voltage from being excessively large.

3. Modified Example

Although the embodiments of the present disclosure are described in detail heretofore, the present disclosure is not limited to the above-described embodiments, but various modifications are available based on the technical spirit of the present disclosure. For example, the configurations, methods, processes, shapes, materials, numerical values, and the like in the above-described embodiments are merely examples, and if necessary, other configurations, methods, processes, shapes, materials, numerical values, and the like may be employed.

FIG. 11 illustrates a modified example of the present disclosure. In the above-described first and second embodiments, the control circuit 54 is configured to include the voltage detector 52. In contrast, the battery system side may be configured to include a voltage detector 55, and the total battery voltage may be supplied from the voltage detector 55 to a comparison operator 53.

Furthermore, as illustrated in FIG. 12, the battery system may be configured to include the voltage detector 55 and the comparison operator 56. A control signal for current setting is supplied from the comparison operator 56 to a bi-directional inverter 51, so that the charging current is set.

4. Application Example

Hereinafter, application examples of the above-described charging control in the present disclosure will be described. The application example of the charging control is not limited to the application examples described below.

Electricity Storage System of House

An example where the present disclosure is applied to an electricity storage system for a house will be described with reference to FIG. 13. The electricity storage system is a power system which includes an electric power information transceiver transmitting/receiving signals from/to other devices through a network and controls charging and discharging of the electricity storage device based on the information received by the transceiver. For example, in an electricity storage system 100 for a house 101, electric power is supplied from a centralized power system 102 of a thermal power generation 102a, a nuclear power generation 102b, a hydroelectric power generation 102c, and the like to an electricity storage device 103 through a power network 109, an information network 112, a smart meter 107, a power hub 108, and the like. In addition, electric power is supplied from independent power supplies such as a domestic power generating device 104 to the electricity storage device 103. The electric power supplied to the electricity storage device 103 is stored. The electric power which is to be used in the house 101 is supplied by using the electricity storage device 103. The use of the electricity storage system is not limited to the house 101, but the same electricity storage system can be used for a building.

In the house 101, a power generating device 104, a power consuming device 105, an electricity storage device 103, a control device 110 controlling the devices, a smart meter 107, and sensors 111 acquiring various types of information are installed. The devices are connected through a power network 109 and an information network 112. As the power generating device 104, a solar cell, a fuel cell, and the like are used, and the generated electric power is supplied to the power consuming device 105 and/or the electricity storage device 103. The power consuming device 105 includes a refrigerator 105a, an air conditioner 105b as an air conditioning device, a television set 105c as a television receiver, a bath 105d, and the like. In addition, the power consuming device 105 includes an electric vehicle 106. The electric vehicle 106 is an electric car 106a, a hybrid car 106b, or an electric motorcycle 106c.

The above-described charging control of the present disclosure is applied to the electricity storage device 103. The electricity storage device 103 has an electricity storage unit including a battery pack configured with a secondary battery or a capacitor. The electricity storage device 103 has an electricity storage unit including a battery pack configured with, for example, a lithium ion secondary battery. The lithium ion secondary battery may be a stationary type or a type used for an electric vehicle 106. The electricity storage device 103 may be configured with a plurality of the electricity storage devices. The smart meter 107 has a function of measuring a used amount of commercial electric power and transmitting the measured used amount to an electric power company. The power network 109 may be any one of DC power supply, AC power supply, and non-contact power supply or a combination thereof.

The various sensors 111 include, for example, a human sensor, a luminance sensor, an object detection sensor, a power consumption sensor, a vibration sensor, a contact sensor, a temperature sensor, an infrared sensor, and the like. The information acquired by the various sensors 111 is transmitted to the control device 110. Weather conditions, person conditions, and the like are checked based on the information from the sensors 111, and thus, the power consuming device 105 is automatically controlled, so that it is possible to minimize energy consumption. In addition, the control device 110 may transmit the information on the house 101 to an external electric power company or the like through the Internet.

The processes such as the shunting of the electric power line and the DC/AC conversion are performed by the power hub 108. As a communication method of the information network 112 connected to the control device 110, there are a method using a communication interface such as a UART (Universal Asynchronous Receiver-Transceiver) and a method using a sensor network in accordance with a radio communication standard such as Bluetooth (registered trade mark), ZigBee, or Wi-Fi. The Bluetooth (registered trade mark) method is applied to multimedia communication, so that one-to-multiple communication can be implemented. In the ZigBee method, physical layers are used in accordance with IEEE (Institute of Electrical and Electronics Engineers) 802.15.4. The IEEE802.15.4 is the name of a short-range wireless network standard called PAN (Personal Area Network) or W (Wireless) PAN.

The control device 110 is connected to an external server 113. The server 113 may be managed by any of the house 101, the electric power company, and a service provider. The information received or transmitted by the server 113 is, for example, power consumption information, life pattern information, electricity rates, weather information, natural disaster information, and information on electricity transaction. The information may be received/transmitted from/to a power consuming device in a house (for example, a television set) in a house, or may be received/transmitted from/to a device outside a house (for example, a mobile phone). The information may be displayed on a device having a display function, for example, a television set, a mobile phone, a PDA (Personal Digital Assistants), or the like.

The control device 110 which controls the components is configured to include a CPU (Central Processing Unit), a RAM (Random Access Memory), a ROM (Read Only Memory), and the like, and in this example, the control device is included in the electricity storage device 103. The control device 110 is connected to the electricity storage device 103, the domestic power generating device 104, the power consuming device 105, the various sensors 111, and the server 113 through the information network 112 and has a function of adjusting, for example, a used amount and generated amount of commercial electric power. Besides, the control device may have a function such as performing electricity transaction in an electric power market.

As described above, electric power can be stored in the centralized power system 102 such as a thermal power generation 102a, a nuclear power generation 102b, and a hydroelectric power generation 102c, and generated electric power of domestic power generating devices 104 (solar power generation, wind power generation) can be stored in the electricity storage device 103. Therefore, even if the generated power of the domestic power generating device 104 is changed, it is possible to perform control so that the electric power amount transmitted to an external portion becomes constant or so that the electric power amount is discharged as needed. For example, in a method, the electric power obtained by the solar power generation may be stored in the electricity storage device 103, and at night, the midnight power of which rate is inexpensive may be stored in the electricity storage device 103. In the daytime where the rate is expensive, the electric power stored in the electricity storage device 103 may be discharged and used.

In addition, in this example, although the example where the control device 110 is installed in the electricity storage device 103 is described, the control device may be included in the smart meter 107 or may be configured independently. In addition, the power storage device 100 may be used for plural houses in an apartment complex or may be used for plural detached houses.

Electricity Storage System of Vehicle

An example where the present disclosure is applied to an electricity storage system for a vehicle will be described with reference to FIG. 14. FIG. 14 schematically illustrates an example of a configuration of a hybrid vehicle employing a series hybrid system to which the present disclosure is applied. The series hybrid system is a car which drives with a power/driving force converting device by using electric power generated by a generator working with an engine or the electric power stored in a battery.

The hybrid vehicle 200 includes an engine 201, a generator 202, a power/driving force converting device 203, a drive wheel 204a, a drive wheel 204b, a car wheel 205a, a car wheel 205b, a battery 208, a vehicle control device 209, various sensors 210, and a charging inlet 211. The above-described charging control of the present disclosure is applied to the battery 208. The battery 208 is, for example, one or a plurality of electricity storage devices.

The hybrid vehicle 200 drives by using the power/driving force converting device 203 as a driving source. As an example of the power/driving force converting device 203 is a motor. The power/driving force converting device 203 is operated by the electric power of the battery 208, and the rotational force of the power/driving force converting device 203 is transmitted to the drive wheels 204a and 204b. In addition, by utilizing DC-AC conversion or inverse conversion (AC-DC conversion) for necessary portions, the power/driving force converting device 203 may be adaptable to an AC motor or a DC motor. The various sensors 210 are used to control the engine rotation speed through the vehicle control device 209 or to control the opening (throttle opening) of the throttle valve (not shown). The various sensors 210 include a speed sensor, an acceleration sensor, an engine rotation speed sensor, and the like.

The rotation force of the engine 201 can be transmitted to the generator 202, and the electric power generated from the rotation force by the generator 202 can be stored in the battery 208.

When the hybrid vehicle is decelerated by a braking mechanism (not shown), a resistance force during the deceleration is applied as a rotation force to the power/driving force converting device 203, and recovered electric power generated from the rotation force by the power/driving force converting device 203 is stored in the battery 208.

The battery 208 is connected to an external power supply of the hybrid vehicle, so that the battery may be supplied with electric power from the external power supply by using the charging inlet 211 as an input inlet and the battery may store the supplied electric power.

Although not shown, an information processing device which processes the information on the vehicle control based on the information on the secondary battery may be installed. As the information processing device, there is an information processing device which displays a battery remaining capacity based on, for example, information on the remaining capacity of the battery.

In addition, heretofore, the series hybrid vehicle which drives with the motor by using the electric power generated by the generator working with the engine or the electric power stored in the battery is described as an example. However, the present disclosure may be effectively applied to a parallel hybrid vehicle which uses any output of the engine and the motor as a driving source while appropriately and switchably using three driving modes of only engine driving, only motor driving, and engine and motor driving. In addition, the present disclosure may be effectively applied to a so-called electric vehicle where drives by using only the driving motor without using the engine.

In addition, the present disclosure may have the following configurations.

(1)

A charging device including a charging voltage generating unit which generates a charging voltage for an electricity storage unit including a battery pack where a plurality of battery cells or a plurality of parallel connections of the battery cells are connected in series, wherein the charging voltage is set to be a sum of a value obtained by subtracting a maximum cell voltage from a fully charged voltage and a total battery voltage.

(2)

The charging device according to (1), wherein the charging voltage is formed by decreasing by a sum value of variation voltages between the battery cells of the electricity storage unit from a charging set voltage.

(3)

The charging device according to (1), further including a voltage detector which detects the total battery voltage.

(4)

The charging device according to (1), further including a comparison operator which performs a comparison operation on a charging set voltage and the total battery voltage.

(5)

The charging device according to (1), further including:

a voltage detector which detects the total battery voltage; and a comparison operator which performs the comparison operation on a charging set voltage and the total battery voltage.

(6)

The charging device according to any of (1) to (5), wherein the battery cell includes a positive electrode active material having an olivine structure.

(7)

A charging control method in which a charging voltage generating unit generates a charging voltage for an electricity storage unit including a battery pack where a plurality of battery cells or a plurality of parallel connections of the battery cells are connected in series, wherein the charging voltage is set to be a sum of a value obtained by subtracting a maximum cell voltage from a fully charged voltage and a total battery voltage.

(8)

An electricity storage device including:

an electricity storage unit which includes a battery pack where a plurality of battery cells or a plurality of parallel connections of the battery cells are connected in series; and a charging voltage generating unit which generates a charging voltage for the electricity storage unit, wherein the charging voltage is set to be a sum of a value obtained by subtracting a maximum cell voltage from a fully charged voltage and a total battery voltage.

(9)

The electricity storage device according to (8), wherein the electricity storage unit further includes a voltage detector which detects the total battery voltage.

(10)

The electricity storage device according to (8), wherein the electricity storage unit further includes:

a voltage detector which detects a total battery voltage; and a comparison operator which performs a comparison operation on the charging set voltage and the total battery voltage.

(11)

The electricity storage device according to [9], further including a comparison operator which performs a comparison operation on the charging set voltage and the total battery voltage.

(12)

A power storage device including an electricity storage device, wherein the electricity storage device includes:

an electricity storage unit which includes a battery pack where a plurality of battery cells or a plurality of parallel connections of the battery cells are connected in series; and a charging voltage generating unit which generates a charging voltage for the electricity storage unit, and the charging voltage is set to be a sum of a value obtained by subtracting a maximum cell voltage from a fully charged voltage and a total battery voltage.

(13)

A power system including the electricity storage device according to (8), wherein the power system controls charging and discharging of the electricity storage device based on information received by an electric power information transceiver which transmits/receives signals from/to other devices through a network.

(14)

An electric vehicle including the electricity storage device according to (8), wherein the electric vehicle includes:

a converting device which converts electric power supplied from the electricity storage device into a driving force for the vehicle; and a control device which processes information on vehicle control based on information on the electricity storage device.

(15)

A charging device, comprising:

a charging voltage providing unit configured to provide a maximum charging voltage for an electricity storage unit, wherein the electricity storage unit includes a plurality of battery cells, and wherein the maximum charging voltage satisfies an equation (1) below:

$$\text{Maximum Charging Voltage} = \text{Total Battery Voltage} + (\text{Fully Charged Voltage} - \text{Maximum Cell Voltage}) * n \quad (1)$$

wherein n represents a total number of the battery cells connected in series.

(16)

The charging device according to (15), wherein the maximum charging voltage further satisfies an equation (2) below:

$$\text{Maximum Charging Voltage} = \text{Charging Set Voltage} - Vd \quad (2)$$

wherein Vd is a sum total of a voltage difference between a maximum cell voltage and a cell voltage corresponding to each of the battery cells connected in series.

(17)

The charging device according to (16), wherein the charging set voltage is a product of the fully charged voltage of the battery cells and the total number of the battery cells connected in series.

(18)

The charging device according to (15), further comprising a voltage detector configured to detect the total battery voltage.

(19)

The charging device according to (16), further comprising a comparison operator configured to perform a comparison operation on the charging set voltage and the total battery voltage.

(20)

The charging device according to (16), further comprising:

a voltage detector configured to detect the total battery voltage; and a comparison operator configured to perform a comparison operation on the charging set voltage and the total battery voltage.

(21)

The charging device according to any of (15) to (20), wherein at least one of the battery cells includes a positive electrode active material having an olivine structure.

(22)

A charging control method comprising:

providing a maximum charging voltage for an electricity storage unit by a charging voltage providing unit, wherein the electricity storage unit includes a plurality of battery cells, and wherein the maximum charging voltage is provided and satisfies an equation (1) below:

$$\text{Maximum Charging Voltage} = \text{Total Battery Voltage} + (\text{Fully Charged Voltage} - \text{Maximum Cell Voltage}) * n \quad (1)$$

wherein n represents a total number of the battery cells connected in series.

(23)

An electricity storage device, comprising:

an electricity storage unit including a plurality of battery cells; and a charging voltage providing unit configured to provide a maximum charging voltage for the electricity storage unit, wherein the maximum charging voltage satisfies an equation (1) below:

$$\text{Maximum Charging Voltage} = \text{Total Battery Voltage} + (\text{Fully Charged Voltage} - \text{Maximum Cell Voltage}) * n \quad (1)$$

wherein n represents a total number of the battery cells connected in series.

(24)

The electricity storage device according to (23), wherein the maximum charging voltage further satisfies an equation (2) below $$\text{Maximum Charging Voltage} = \text{Charging Set Voltage} - Vd \qquad (2)$$

wherein Vd is a sum total of a voltage difference between a maximum cell voltage and a cell voltage corresponding to each of the battery cells connected in series.

(25)

The electricity storage device according to (23), wherein the electricity storage unit further comprises a voltage detector configured to detect the total battery voltage.

(26)

The electricity storage device according to (25), further comprising a comparison operator configured to perform a comparison operation on the charging set voltage and the total battery voltage.

(27)

A power system comprising the electricity storage device according to (23), wherein the power system is configured to control charging and discharging of the electricity storage device based on information received by an electric power information transceiver configured to transmit and receive signals through a network.

(28)

A power storage device comprising the electricity storage device according to (23).

(29)

An electric vehicle comprising the electricity storage device according to (23), wherein the electric vehicle includes:

a converting device configured to convert electric power supplied from the electricity storage device into a driving force for the vehicle; and a control device configured to control the vehicle based on information corresponding to the electricity storage device.

REFERENCE SIGNS LIST

MOD, MOD1 to MODN Electricity storage module
ICNT Main controller
CNT Module controller
C1 to Cn Cell
BB1 to BBn Electricity storage unit
12, 19 A/D converter and comparator
13 Monitoring circuit
16 Temperature multiplexer
20 Sub-microcontroller unit
21 Communication unit
23 Cell balance discharging circuit
30 Main microcontroller unit
51 Bi-directional inverter
52, 55 Voltage detector
53, 56 Comparison operator
100 Electricity storage system
101 House
102 Centralized power system
102a Thermal power generation
102b Nuclear power generation
102c Hydroelectric power generation
103 Electricity storage device
104 Power generating device
105 Power consuming device
105a Refrigerator
105b Air-conditioner
105c Television set
06 Electric vehicle
106a Electric car
106b Hybrid car
106c Electric motorcycle
107 Smart meter
108 Power hub
109 Power network
110 Control device
111 Sensor
112 Information network
113 Server
200 Hybrid vehicle
201 Engine
202 Power generator
203 Power/driving force converting device
204a Drive wheel
204b Drive wheel
205a Car wheel
205b Car wheel
208 Battery
209 Vehicle control device
210 Sensor
211 Charging Inlet

The invention claimed is:

1. A charging device, comprising:

a main controller configured to provide, to a control circuit, a maximum charging voltage for an electricity storage unit, wherein the electricity storage unit includes a plurality of battery cells in a battery, and at least one battery cell in the plurality of battery cells has a lower voltage than another battery cell in the plurality of battery cells, wherein the maximum charging value is determined based on at least a total battery voltage, a fully charged cell voltage, and a maximum cell voltage, wherein the maximum charging voltage satisfies an equation (1) below:

$$\text{Maximum Charging Voltage} = \text{Total Battery Voltage} + (\text{Fully Charged Cell Voltage} - \text{Maximum Cell Voltage}) * n \qquad (1)$$

wherein n represents a total number of the battery cells connected in series, wherein the total battery voltage represents a total combined voltage of the plurality of battery cells in the battery, wherein the fully charged cell voltage represents a predefined voltage value that represents a voltage at which any one battery cell of the plurality of battery cells is configured to be fully charged, wherein the maximum cell voltage represents a voltage value of a battery cell of the plurality of battery cells that has the highest voltage value, and wherein the maximum charging voltage satisfies the equation (1) at a plurality of maximum cell voltage values, including when the maximum cell voltage is less than the fully charged cell voltage.

2. The charging device according to claim 1, wherein the maximum charging voltage further satisfies an equation (2) below:

$$\text{Maximum Charging Voltage} = \text{Charging Set Voltage} - Vd \qquad (2)$$

wherein Vd is a sum total of a voltage difference between a maximum cell voltage and a cell voltage corresponding to each of the battery cells connected in series.

3. The charging device according to claim 2, wherein the charging set voltage is a product of the fully charged voltage of the battery cells and the total number of the battery cells connected in series.

4. The charging device according to claim 1, further comprising a voltage detector configured to detect the total battery voltage.

5. The charging device according to claim 2, further comprising a comparison operator configured to perform a comparison operation on the charging set voltage and the total battery voltage.

6. The charging device according to claim 2, further comprising: a voltage detector configured to detect the total battery voltage; and
- a comparison operator configured to perform a comparison operation on the charging set voltage and the total battery voltage.

7. The charging device according to claim 1, wherein at least one of the battery cells includes a positive electrode active material having an olivine structure.

8. A charging control method comprising:
- providing, by a main controller, to a control circuit, a maximum charging voltage for an electricity storage unit,
- wherein the maximum charging value is determined based on at least a total battery voltage, a fully charged cell voltage, and a maximum cell voltage,
- wherein the electricity storage unit includes a plurality of battery cells in a battery, at least one battery cell in the plurality of battery cells has a lower voltage than another battery cell in the plurality of battery cells, and
- wherein the maximum charging voltage is provided and satisfies an equation (1) below:

$$\text{Maximum Charging Voltage} = \text{Total Battery Voltage} + (\text{Fully Charged Cell Voltage} - \text{Maximum Cell Voltage})*n \quad (1)$$

- wherein n represents a total number of the battery cells connected in series,
- wherein the total battery voltage is a total combined voltage of the plurality of battery cells in the battery,
- wherein the fully charged cell voltage is a predefined voltage value that represents a voltage at which any one battery cell of the plurality of battery cells is configured to be fully charged,
- wherein the maximum cell voltage is a voltage value of a battery cell of the plurality of battery cells that has the highest voltage value, and
- wherein the maximum charging voltage satisfies the equation (1) at a plurality of maximum cell voltage values, including when the maximum cell voltage is less than the fully charged cell voltage.

9. An electricity storage device, comprising:
- an electricity storage unit including a plurality of battery cells in a battery, and at least one battery cell in the plurality of battery cells has a lower voltage than another battery cell in the plurality of battery cells; and
- a main controller configured to provide, to a control circuit, a maximum charging voltage for the electricity storage unit,
- wherein the maximum charging value is determined based on at least a total battery voltage, a fully charged cell voltage, and a maximum cell voltage,
- wherein the maximum charging voltage satisfies an equation (1) below:

$$\text{Maximum Charging Voltage} = \text{Total Battery Voltage} + (\text{Fully Charged Cell Voltage} - \text{Maximum Cell Voltage})*n \quad (1)$$

- wherein n represents a total number of the battery cells connected in series,
- wherein the total battery voltage is a total combined voltage of the plurality of battery cells in the battery,
- wherein the fully charged cell voltage is a predefined voltage value that represents a voltage at which any one battery cell of the plurality of battery cells is configured to be fully charged,
- wherein the maximum cell voltage is a voltage value of a battery cell of the plurality of battery cells that has the highest voltage value, and
- wherein the maximum charging voltage satisfies the equation (1) at a plurality of maximum cell voltage values, including when the maximum cell voltage is less than the fully charged cell voltage.

10. The electricity storage device according to claim 9, wherein the maximum charging voltage further satisfies an equation (2) below $$\text{Maximum Charging Voltage} = \text{Charging Set Voltage} - Vd \quad (2)$$

wherein Vd is a sum total of a voltage difference between a maximum cell voltage and a cell voltage corresponding to each of the battery cells connected in series.

11. The electricity storage device according to claim 9, wherein the electricity storage unit further comprises a voltage detector configured to detect the total battery voltage.

12. The electricity storage device according to claim 11, further comprising a comparison operator configured to perform a comparison operation on the charging set voltage and the total battery voltage.

13. A power system comprising the electricity storage device according to claim 9,
- wherein the power system is configured to control charging and dis-charging of the electricity storage device based on information received by an electric power information transceiver configured to transmit and receive signals through a network.

14. A power storage device comprising the electricity storage device according to claim 9.

15. An electric vehicle comprising the electricity storage device according to claim 9,
- wherein the electric vehicle includes:
- a converting device configured to convert electric power supplied from the electricity storage device into a driving force for the vehicle; and
- a control device configured to control the vehicle based on in-formation corresponding to the electricity storage device.

* * * * *